(12) United States Patent
Petersen

(10) Patent No.: US 11,751,575 B1
(45) Date of Patent: Sep. 12, 2023

(54) EMBOSSING ATTACHMENT FOR A ROLLING PIN

(71) Applicant: Carol Petersen, Snohomish, WA (US)

(72) Inventor: Carol Petersen, Snohomish, WA (US)

(*) Notice: Subject to any disclaimer, the term of this patent is extended or adjusted under 35 U.S.C. 154(b) by 189 days.

(21) Appl. No.: 17/363,956

(22) Filed: Jun. 30, 2021

(51) Int. Cl.
*A21C 3/02* (2006.01)

(52) U.S. Cl.
CPC .............. *A21C 3/028* (2013.01); *A21C 3/021* (2013.01)

(58) Field of Classification Search
CPC .................................. A21C 3/028; A21C 3/021
See application file for complete search history.

(56) References Cited

U.S. PATENT DOCUMENTS

| | | | | |
|---|---|---|---|---|
| 3,196,520 A * | 7/1965 | Appenzeller | ........... | B29C 43/22 162/358.1 |
| 4,070,742 A * | 1/1978 | Dorfman | ................ | A21C 3/021 492/14 |
| 4,116,594 A * | 9/1978 | Leanna | .................... | F16C 13/00 425/3 |
| 4,159,677 A * | 7/1979 | Smith | .................... | B44B 5/0009 492/54 |
| 5,281,222 A * | 1/1994 | Allard | ................ | A61B 17/7032 606/264 |
| 6,257,135 B1 * | 7/2001 | Dorton, Jr. | ................ | B31F 1/07 101/23 |
| 6,716,017 B2 * | 4/2004 | Papadopoulas | ........... | B31F 1/07 492/38 |
| 7,052,450 B2 | 5/2006 | Dua et al. | | |
| 7,686,752 B2 | 3/2010 | Dua et al. | | |
| 7,881,762 B2 * | 2/2011 | Kling | .................... | A61B 5/6838 600/323 |
| D760,554 S | 7/2016 | Finizio | | |
| 2013/0056602 A1 * | 3/2013 | Zivku | ................... | A47G 29/083 248/339 |
| 2020/0128927 A1 * | 4/2020 | Beatty | ................ | A44B 17/0058 |

FOREIGN PATENT DOCUMENTS

CN 104286065 A * 1/2015 ............. A21C 3/021

OTHER PUBLICATIONS

15" Rolling Pin Covers. Product Listing [online]. © 2003-2021 Blain Supply, Inc. [retrieved on Dec. 23, 2020]. Retrieved from the Internet: <URL: https://www.farmandfleet.com/products/201101-bethany-housewares-15-rolling-pin-covers.html>.
Regency Rolling Pin Covers 2pce. Product Listing [online]. © 2021 Peter's of Kensington [retrieved on Dec. 23, 2020]. Retrieved from the Internet: <URL: https://www.petersofkensington.com.au/Public/Regency-Rolling-Pin-Covers-2pce.aspx>.
Kente Embossing Rolling Pin. Product Listing [online]. © 2021 Etsy, Inc. [retrieved on Dec. 23, 2020]. Retrieved from the Internet: <URL: https://www.etsy.com/listing/893377178/kente-embossing-rolling-pin?ref=sold_out_ad-1&plkey=1751a752f561227d0c58572c2075b31ea19a2338%3A893377178&frs=1>.
Curly patterned rolling pin, 3D cookie stamp with floral motifs. Product Listing [online]. © 2021 Etsy, Inc. [retrieved on Dec. 23, 2020]. Retrieved from the Internet: <URL: https://www.etsy.com/listing/503321098/curly-patterned-rolling-pin-3d-cookie?ref=sold_out_ad-4&plkey=6bc271c594e43bcae70aa863243d86028a092522%3A503321098>.

* cited by examiner

*Primary Examiner* — Sarang Afzali
(74) *Attorney, Agent, or Firm* — CRAMER PATENT & DESIGN, PLLC; Aaron R. Cramer

(57) ABSTRACT

An embossing attachment for rolling pin is a tensioned tube of food safe material having a lengthwise seam permitting the device to be opened flat then snapped into place about a tubular rolling pin. The surface of the device has a plurality of textured shapes and figures which are imparted into a dough when rolled over the upper surface of the dough.

11 Claims, 4 Drawing Sheets

EMBOSSING ATTACHMENT FOR A ROLLING PIN

RELATED APPLICATIONS

None.

FIELD OF THE INVENTION

The present invention relates generally to a rolling attachment and more specifically to a rolling attachment for a rolling pin.

BACKGROUND OF THE INVENTION

Just about everyone loves the taste of baked goods. Whether it is a cookie, a pie, dinner rolls, breakfast pastry, or similar item, they are enjoyed all over the world at just about all times of the day. One aspect of baked goods common to almost all is that the usage of a rolling pin is often involved. Rolling pin are used to evenly flatten everything from pie and pastry doughs to cookie and pasta doughs.

While their overall design has remained unchanged for generations, one recent modification is an embossed exterior pattern on the rolling pin which is imparted to the dough as it is rolled out. While certainly aesthetically pleasing, it does mean that a separate rolling pin is required for each embossed pattern. All of these rolling pins take up valuable space in a kitchen no matter how large the kitchen is.

Additionally, each rolling pin that is purchased costs additional money, whose costs can quickly accumulate over time. Accordingly, there exists a need for a means by which the features of an embossed rolling pin can be enjoyed without the disadvantages as described above. The development of the embossing attachment for rolling pin fulfills this need.

SUMMARY OF THE INVENTION

To achieve the above and other objectives, the present invention provides for an embossing attachment having an inner surface contacting with a rolling on body of a rolling pin, an outer surface having an embossing disposed on the outer surface and, a flat spring embedded between the inner surface and the outer surface. The embossing attachment may be attached to the rolling pin having the rolling on body and a handle.

The rolling on body may be provided with a center shaft, a bearing, and a race. The embossing attachment may be held in place on the rolling on body via a friction fit. The rolling on body may rotate along a rotational travel path and produces a linear travel path and the embossing produces a transferred pattern on a food product along the linear travel path. The food product may be baking dough and/or rolled icing.

The transferred pattern may be a negative image of the embossing with a spacing that mirrors the repeating pattern. The embossing attachment may be attached to a one-piece rolling pin. The embossing may be in a repeating pattern. The repeating pattern may be a pattern selected from the group consisting of a geometric pattern, a fruit pattern, a holiday pattern, a cartoon character pattern, an animal pattern, a hobby pattern, or a toy pattern.

The embossing attachment may further comprise a seem when a plurality of edges meets. The flat spring does not penetrate the edges such that the seem provides a flat continuous surface on the outer surface. The flat spring may maintain a continuous inward pressure that provides for the friction fit. The flat spring may be made of stainless steel. The embossing attachment may be made of a food safe material. The embossing attachment may be made of silicon to prevent the outer surface from sticking to the food product. The embossing attachment is 9¼ in. long and 7¼ in. in width. The embossing attachment may be is 0.030 thick.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
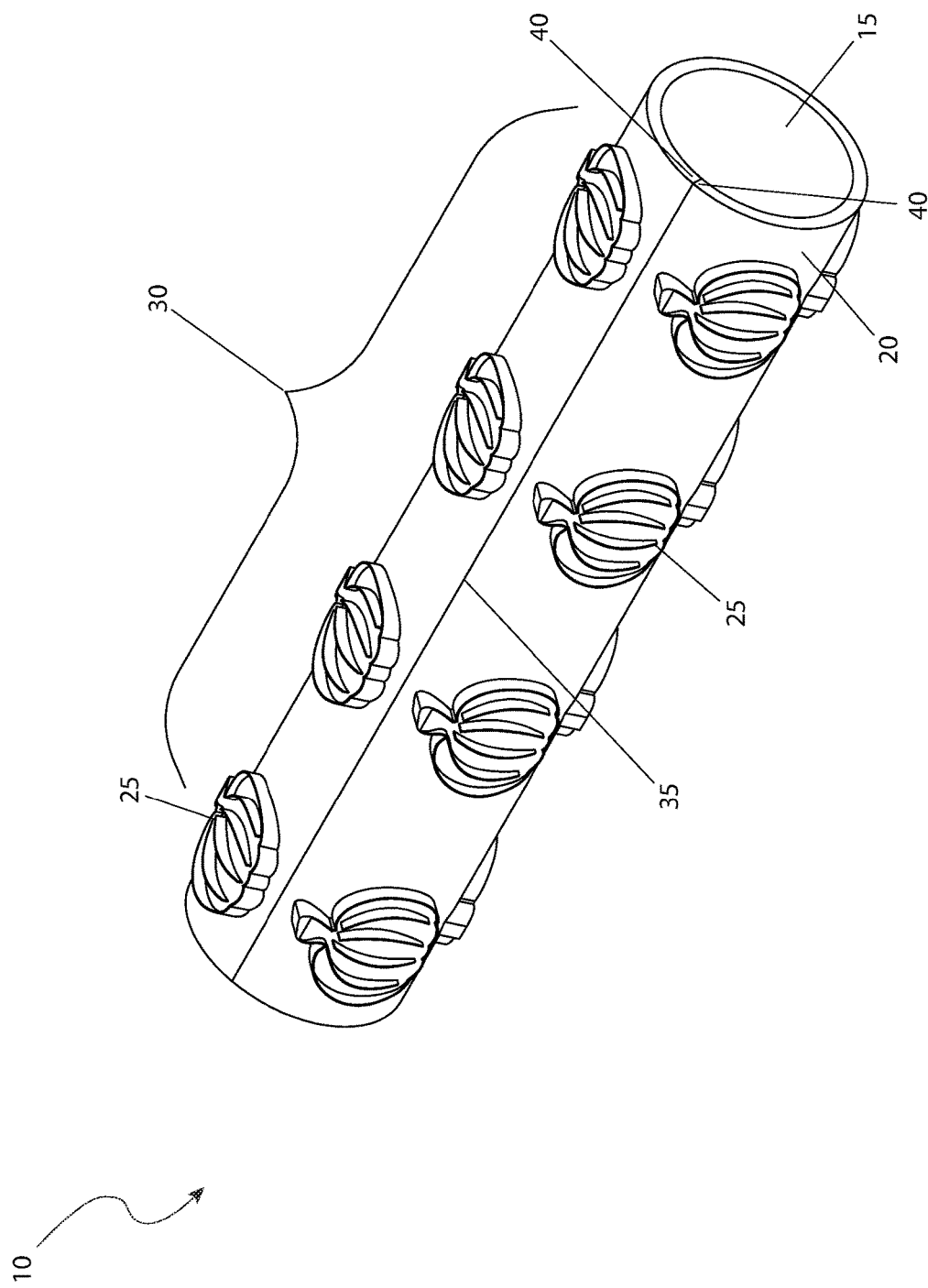
FIG. 1 is a perspective view of the embossing attachment for a rolling pin, in a rolled state, according to the preferred embodiment of the present invention.

DESCRIPTIVE KEY 10 embossing attachment
15 inner surface
20 outer surface
25 embossing
30 repeating pattern
35 seam
40 edge
45 rolling pin
50 rolling on body
55 handle
60 rotational travel path "r"
65 linear travel path "l"
70 transferred pattern
75 food product
80 center shaft
85 bearing
90 race
95 flat spring
100 inward pressure

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the embossing attachment 10, in a rolled state, according to the preferred embodiment of the present invention is disclosed. The embossing attachment (herein also described as the "attachment") 10, is intended to be positioned on the outer surface of a rolling pin 45. The attachment 10 provides for an inner surface 15 and an outer surface 20 which is envisioned to be made of silicone or similar food-safe material. The overall size of the attachment 10 would be slightly larger than that of a rolling pin 45 which will be shown in greater detail herein below. The outer surface 20 is provided with embossing 25, preferably in a repeating pattern 30. The embossing 25, herein shown as a pumpkin for illustrative purposes, would be available in a wide variety of patterns including but not limited to geometric patterns, fruit patterns (for pies), holiday patterns (such as pumpkins for Halloween, holiday trees for Christmas, or turkeys for Thanksgiving), cartoon characters, animals, hobbies, toys, or the like. The repeating pattern 30 would vary in size and thus quantity. A large embossing 25 would only be repeated a few times such as ten to twelve (10-12), while a small pattern, such as a geometric pattern would be repeated hundred of times. Other embodiments may include different patterns either orderly or randomly located, or different numbers, positions, or styles of embossing 25. The use of any particular or specific embossing 25 or repeating pattern 30 is not intended to be a limiting factor of the present invention. Finally, a seam 35 is present where the edges 40 of the attachment 10 meet.

Figure 2:
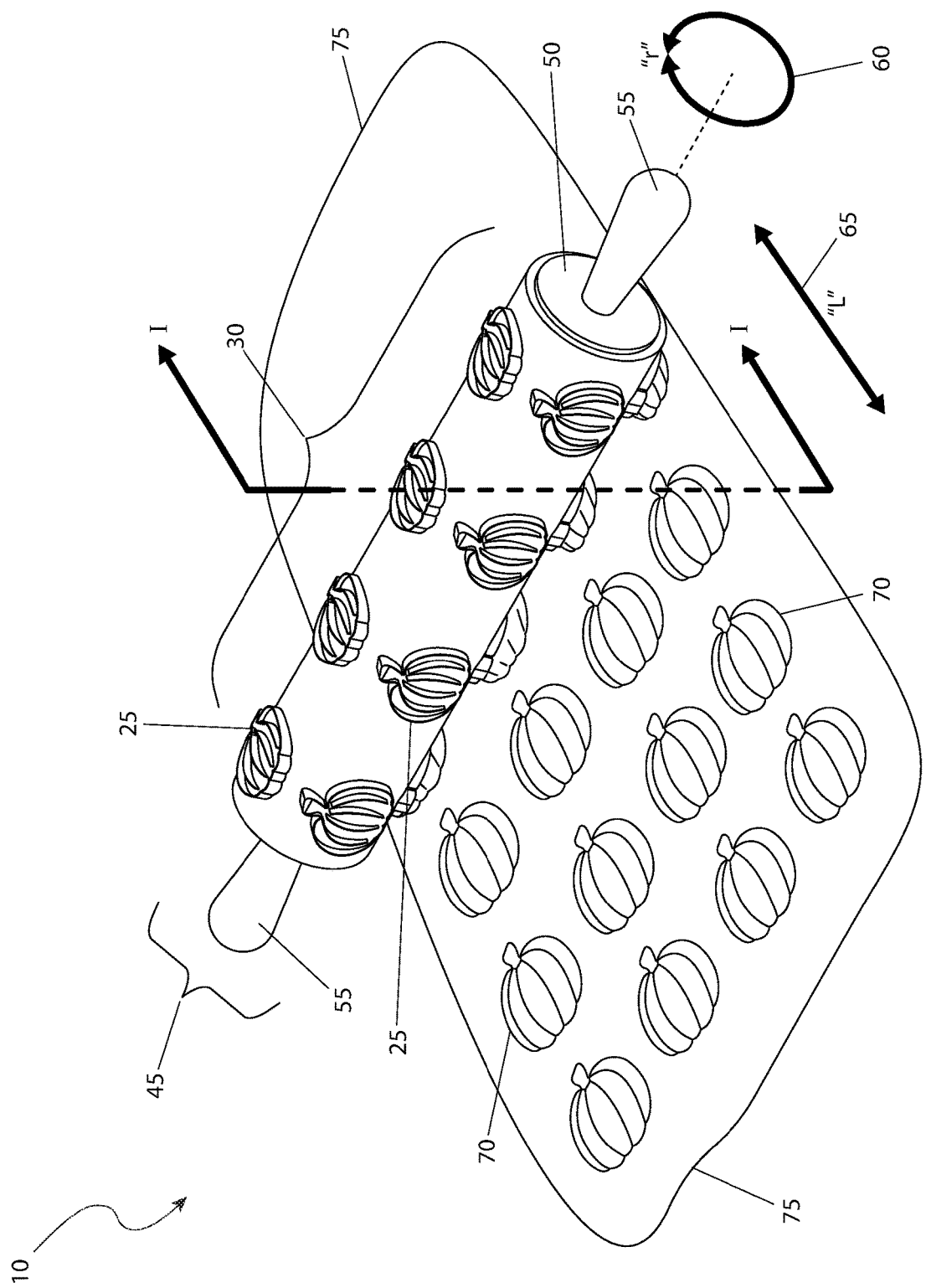
FIG. 2 is a perspective view of the embossing attachment, shown in a state of being utilized, according to the preferred embodiment of the present invention.

Referring next to FIG. 2, a perspective view of the attachment 10, shown in a state of being utilized, according to the preferred embodiment of the present invention is depicted. The attachment 10 is attached to a rolling pin 45 of conventional design including a rolling on body 50 and a handle 55. The attachment 10 is held in place on the rolling on body 50 via friction fit as will be described in greater detail herein below. As the rolling on body 50 rotates along a rotational travel path "r" 60, it produces a linear travel path "l" 65. As such, the embossing 25 will produce transferred pattern 70 on a food product 75 along the linear travel path "l" 65. The transferred pattern 70 will be a negative image of the embossing 25 with a spacing that mirrors the repeating pattern 30. The food product 75 may be various types of baking dough, rolled icing, or similar. The use of the attachment 10 with any particular type or style of food product 75 is not intended to be a limiting factor of the present invention. The silicone construction of the attachment 10, and particular the outer surface 20, prevent it from sticking to the food product 75. Additionally, the silicone construction of the attachment 10 makes it easy to clean after use.

Figure 3:
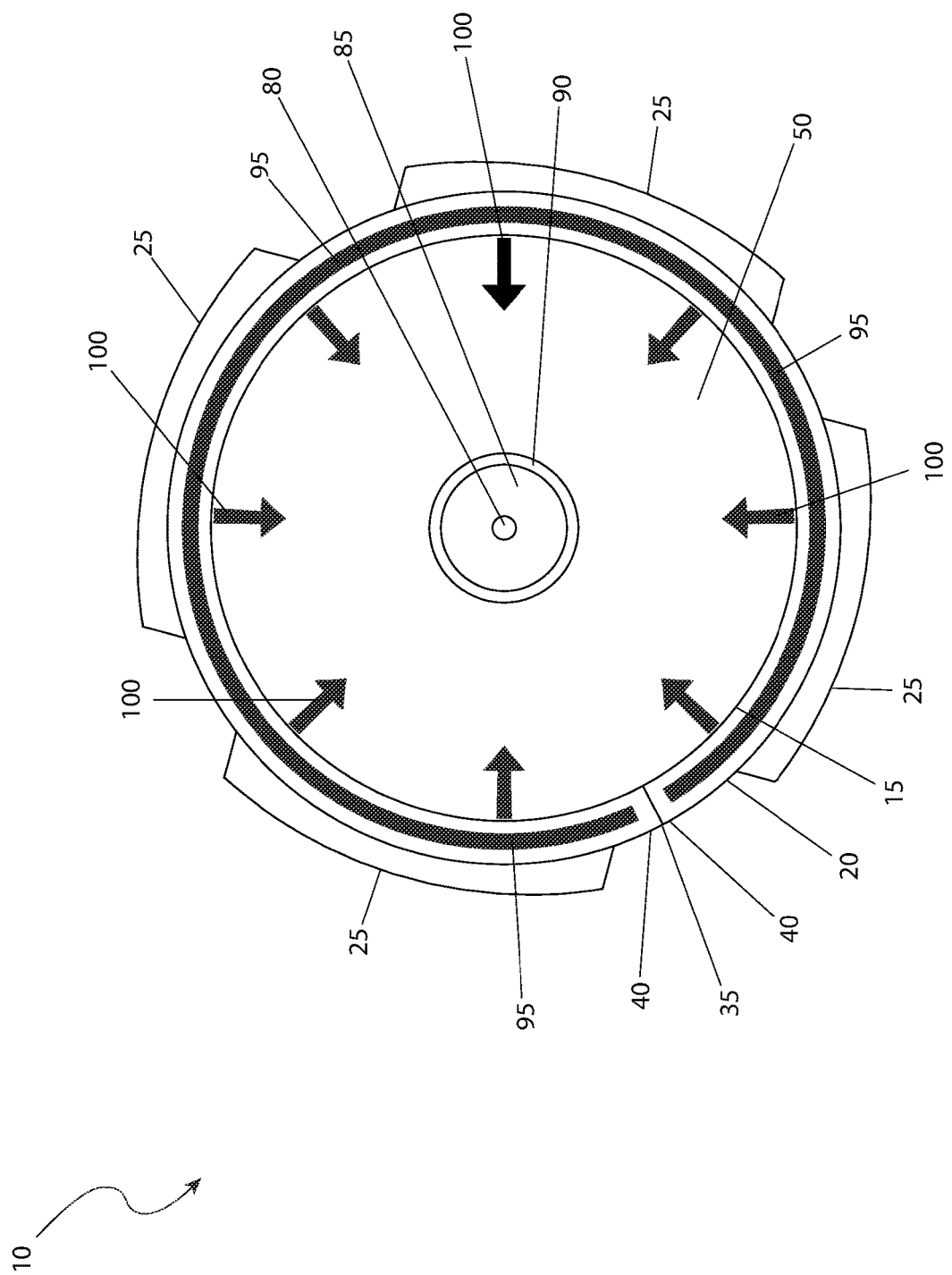
FIG. 3 is a sectional view of the embossing attachment, as seen along a Line I-I, as shown in FIG. 2, according to the preferred embodiment of the present invention; and, FIG. 4 is a perspective view of the embossing attachment, shown in a flattened state, according to the preferred embodiment of the present invention.

Referring now to FIG. 3, a sectional view of the attachment 10, as seen along a Line I-I, as shown in FIG. 2, according to the preferred embodiment of the present invention is shown. The center of the rolling on body 50 may be provided with a center shaft 80, a bearing 85 and a race 90. A one-piece rolling pin 45 (a shown in FIG. 2) with integrated handles 55 (as shown in FIG. 2) may also be utilized with the teachings of the attachment 10 with equal effectiveness. The inner surface 15 of the attachment 10 is in contact with the rolling on body 50. The outer surface 20 contains the embossing 25, molded as an integral part of the outer surface 20. A stainless-steel flat spring 95 is embedded between the inner surface 15 and the outer surface 20. The flat spring 95 is similar in construction to a spring used in a "snap bracelet" in that it maintains a continuous inward pressure 100 that provides for the friction fit. The flat spring 95 does not penetrate the edges 40 such that the seam 35 provides a flat continuous surface on the outer surface 20. The user would remove the attachment 10 by lifting it free of the rolling on body 50 and overcoming the inward pressure 100.

Figure 4:
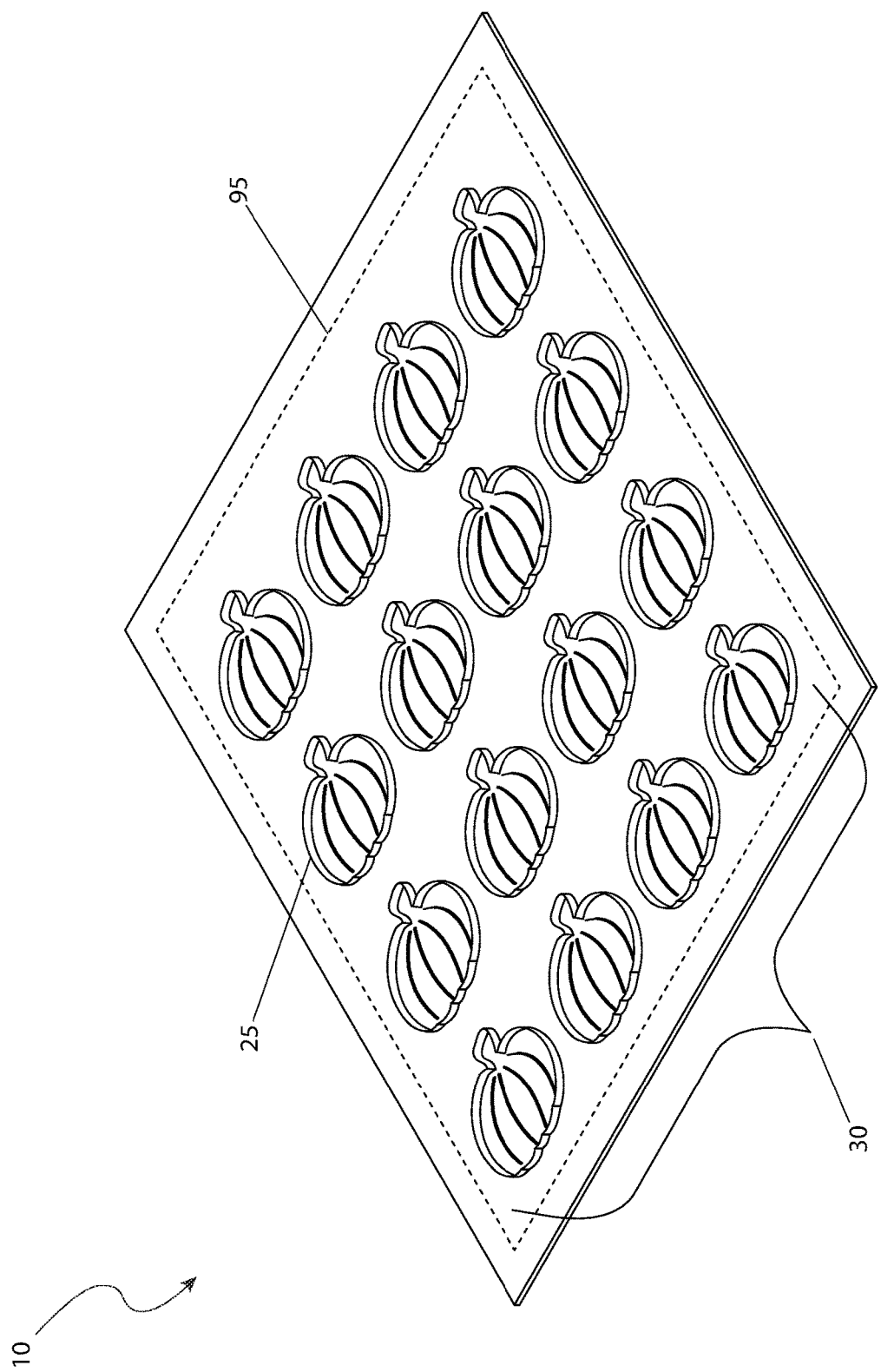

Referring finally to FIG. 4, a perspective view of the attachment 10, shown in a flattened state, according to the preferred embodiment of the present invention is disclosed. The attachment 10 is presented in a flat state, with the flat spring 95 (herein shown by a dashed line due to its hidden state). The flat state allows for compact storage of multiple attachment 10 due to its reduced volume and the ability to stack multiple attachments 10. It is also envisioned that multiple attachments 10 could be stored in a rolled state, with each attachment 10 stored inside of each other in a rolled state as well. As aforementioned described, the similarity of construction of the attachment 10 to a "snap bracelet" allows the attachment 10 to automatically wrap or wind around the rolling on body 50 (as shown in FIG. 3) with only minor contact to the inner surface 15 (a shown in FIG. 3). While the overall size of the attachment 10 can vary per the size of the rolling pin 45 (as shown in FIG. 2) upon which it is used, a typical sized version would be approximately nine and a quarter inches (9¼ in.) by seven and a quarter inches (7¼ in.) and three-hundredths of an inch (0.030) inches thick.

2. Operation of the Preferred Embodiment

The preferred embodiment of the present invention can be utilized by the common user in a simple and effortless manner with little or no training. It is envisioned that the attachment 10 would be constructed in general accordance with FIG. 1 through FIG. 4. The user would procure the attachment 10 from conventional procurement channels such as baking supply stores, kitchen stores discount stores, department stores, mail order and internet supply houses and the like. Special attention would be paid to the overall size of the attachment 10 as well as the desired embossing 25 on the outer surface 20.

After procurement and prior to utilization, the attachment 10 would be prepared in the following manner: the user would wash the attachment 10 in soap and warm water prior to first use; such washing could occur in either the round shape of FIG. 1, or the flat shape of FIG. 4; the attachment 10 would then be placed in a flat shape as seen in FIG. 4; the rolling on body 50 of the rolling pin 45 would be introduced to the inner surface 15 of the attachment 10; the flat spring 95 will then contract resulting the attachment 10 encompassing the circumference of the rolling on body 50; the user would manipulate the attachment 10 to ensure the edges 40 and the seam 35 are in alignment with the axis of the rolling pin 45. At this point in time, the attachment 10 is ready for utilization.

During utilization of the attachment 10, the following procedure would be initiated: the food product 75 would be prepared following conventional practices; the user, holding the handles 55 of the rolling pin 45 with the attachment 10 attached, moves the rolling pin 45 over the food product 75 along the linear travel path "1" 65; the embossing 25 are thus transferred to the food product 75 in the form of a transferred pattern 70. Once the user is satisfied with the transferred pattern 70, the cutting, baking and further processing of the food product 75 then continues in a normal manner with the resulting image of the transferred pattern 70 becoming a permanent image in the food product 75.

After use of the embossing attachment for rolling pin 10, it is cleaned in soap and warm water, allowed to dry, and stored in a flat state as shown in FIG. 4 or a rolled concentric state.

The features of the attachment 10 provide the following benefits: the ability to change different embossing 25 without the space or cost of separate dedicated rolling pin 45; easy application and removal; the ability of the attachment 10 to stay in place on the rolling pin 45 without slippage or accidental removal; the silicone composition prevents sticking to the food product 75; the ability to have any type of embossing 25 imaginable, the ability to use on any type of food product 75, and the ability to personalize the final form of the food product 75 for enjoyment by the user or others.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An embossing attachment, comprising:
   an inner surface adapted to contact a rolling pin;
   an outer surface having an embossing disposed on the outer surface;
   a flat spring embedded between the inner surface and the outer surface; and
   a seam when a plurality of edges of the embossing attachment meet;
   wherein the flat spring is made of stainless steel;
   wherein the embossing rotates along a rotational travel path and produces a linear travel path and the embossing produces a transferred pattern on a food product along the linear travel path;
   wherein the flat spring does not penetrate the edges such that the seam provides a flat continuous surface on the outer surface;
   wherein the flat spring maintains a continuous inward pressure that provides for a friction fit; and
   wherein the embossing attachment is adapted to be attached to and held in place on the rolling pin via the friction fit.

2. The embossing attachment, according to claim 1, wherein the rolling pin is provided with at least a body, a center shaft, and a bearing.

3. The embossing attachment, according to claim 1, wherein the food product is baking dough.

4. The embossing attachment, according to claim 1, wherein the food product is rolled icing.

5. The embossing attachment, according to claim 1, wherein the transferred pattern is a negative image of the embossing with a spacing that mirrors a repeating pattern.

6. The embossing attachment, according to claim 1, wherein the embossing attachment is attached to a one-piece rolling pin.

7. The embossing attachment, according to claim 1, wherein the repeating pattern is a pattern selected from the group consisting of a geometric pattern, a fruit pattern, a holiday pattern, a cartoon character pattern, an animal pattern, a hobby pattern, or a toy pattern.

8. The embossing attachment, according to claim 1, wherein the inner surface and the outer surface are made of a food safe material.

9. The embossing attachment, according to claim 8, wherein the outer surface is made of silicon to prevent the outer surface from sticking to the food product.

10. The embossing attachment, according to claim 1, wherein the embossing attachment is 9¼ inches long.

11. The embossing attachment, according to claim 1, wherein the embossing attachment is 7¼ inches in width.

\* \* \* \* \*